United States Patent Office 3,746,657
Patented July 17, 1973

3,746,657
CATALYST MANUFACTURING PROCESS
Arthur F. Miller and Wilfrid G. Shaw, Lyndhurst, and Hugh M. Blythe, Lima, Ohio, assignors to The Standard Oil Company, Cleveland, Ohio
No Drawing. Filed June 28, 1971, Ser. No. 157,659
Int. Cl. B01j *11/82*
U.S. Cl. 252—437
10 Claims

ABSTRACT OF THE DISCLOSURE

An improved process for the manufacture of a catalyst particularly suitable for use in a "fluidized" bed reactor and comprising an oxide of molybdenum and a supporting material derived from a colloidal sol of an oxide of silicon, aluminum, titanium or zirconium as essential ingredients and optionally the oxide or oxides of one or more additional elements, said process comprising the steps of preparing a slurry of the catalyst components by adding to an aqueous suspension of a molybdate compound the necessary ingredients in the following order: (a) the required amount of colloidal sol of the supporting oxide, (b) acidic components in the form of their corresponding acids, (c) the remaining metal components as a solution of the combined metal salts; spray drying the resultant catalyst slurry, and calcining the spray dried particles at an elevated temperature.

---

This invention relates to an improved process for the manufacture of a catalyst for use in certain chemical processes. More particularly this invention is directed to a process for manufacturing a molybdenum oxide-containing catalyst which utilizes the colloidal properties of the supporting material. The catalysts manufactured by the process of this invention are particularly suitable for use in oxidation reactions conducted in a "fluidized" bed catalytic reactor.

The method of preparation described herein has a number of distinct advantages over established methods of the prior art. These include the production of catalysts with uniformly excellent physical and catalytic properties; the elimination of processing failures in catalyst manufacture; and increase in rate of catalyst manufacture.

The catalytic compositions contemplated to be within the scope of this invention include the oxides of molybdenum including complex oxides thereof, and a supporting material derived from a colloidal sol of an oxide selected from the group consisting of alumina, titania, zirconia and preferably silica as essential components, and which may contain in addition one or more of the oxides of the following elements: phosphorus, arsenic, boron, bismuth, tin, iron, cobalt, nickel, antimony, magnesium, calcium, zinc, cadmium, tantalum, niobium tellurium, manganese, the alkali metals, and the rare earth metals. Catalyst compositions containing these elements are more specifically described in U.S. Pats. Nos. 2,904,580, 3,171,859, 3,248,340, 3,576,764 and in co-pending U.S. Patent application Ser. Nos. 85,722, 112,780, 112,782 and 867,934, now Pat. No. 3,642,930.

In the processes of the prior art the sequence for combining the catalytic components in the preparation of an oxide supported molybdenum oxide-containing catalyst most generally consists of adding the ingredients in the following order: to the colloidal sol of the supporting material is added any acidic component such as, for example, phosphoric acid or boric acid; an aqueous solution of ammonium heptamolybdate or ammonium dimolybdate, the dissolution of the ammonium molybdate being attained by heating; followed by the addition of an acidic solution of metal components as the nitrates; and spray drying the resulting slurry to form a catalyst having the desired particle size, bulk density and porosity.

The large scale manufacture of these catalysts according to the procedure described above has heretofore been burdened with a number of problems. The addition of acidic components such as phosphoric acid to a colloidal sol, such as silica sol, causes instability in the gellation of the silica sol with a resultant lower catalyst production and slurries with varying homogeneity and viscosity properties. The addition of a hot solution of ammonium molybdate (which may also contain molybdic or polymolybdic acids) to the silica sol results in a system which is highly susceptible to gellation and frequently sets-up in the mixing vessel. Dissolution of the molybdenum component with the application of heat causes varying degrees of decomposition of the molybdate material with the generation of insoluble molybdic and/or polymolybdic acids which also seriously interfere with gellation of the silica sol. Consequently, spray-drying of these slurries made difficult by the variability of the physical properties, especially viscosity of the slurry, results in spray-dried products with undesirable variations in quality, in particle size, and attrition properties.

We have discovered a method for preparing the catalyst of this invention which eliminates all of the above process difficulties and the concurrent product quality variations experienced with the well-established catalyst manufacturing processes, and readily permits a high production rate of catalyst with uniformly excellent quality. According to the process of this invention the major steps are as follows:

(1) To water heated to a temperature of up to 150° F., but preferably to less than 120° F., and in amounts less than would have been conventionally used for dissolution of the molybdenum source, is added the alkali metal component, if an alkali metal is to be included in the final catalyst formulation, in the form of its nitrate or hydroxide. Optionally, the alkali metal may be reserved for addition at a subsequent step, for example, with the other metal salts.

(2) The molybdenum source, which may be an ammonium salt such as ammonium heptamolybdate or ammonium dimolybdate in a free-flowing small particle size form, is added to the aqueous solution with mixing. The ammonium heptamolybdate is not completely soluble in the limited volume of the aqueous solution employed and is therefore present as a suspension. The temperature of the suspension decreases from the starting temperature due to the negative heat of solution of ammonium molybdate.

(3) The colloidal sol, preferably silica sol, is then added slowly, in controlled incremental portions, to the aqueous ammonium molybdate suspension. All or part of the required amount of silica sol may be added at this time with the option of adding the remainder of the silica sol to the slurry subsequent to the addition of the metal salts. The silica sol employed is preferably a low alkali aqueous silica sol which is available commercially. A particularly useful commercial product contains from 30 to 50 percent by weight of silica. The temperature required to solubilize the molybdate ingredient of the sol containing ammonium molybdate (and optionally where desired, the alkali metal hydroxide or nitrate) is generally below about 100° F.

(4) Any acid component, such as phosphorus, arsenic or boron, if desired in the final catalyst formulation is advantageously added at this time in the form of its corresponding acid.

(5) The additional metal components of the final catalyst formulation are then added in the form of a concentrated solution of the combined metal salts, which may be the carbonates, acetates, oxalates or preferably the nitrates of the metals or a mixture of these salts.

Where the salts are the nitrates, the solution of the combined metal nitrates is maintained at a temperature sufficient to prevent freezing out of component nitrates. If desired, for purposes of convenience the freezing point of the metal nitrate solution may be lowered by incorporating an excess amount of nitric acid and/or water into the metal nitrate solution. However in general, it is preferred to minimize the excess amount of either water or nitric acid in the mixture in order to maintain a high solids content in the slurry feed to the spray drier.

In the foregoing procedure, the lower temperatures utilized result in better control of gellation of the silica sol since temperature and gellation are interrelated. Additionally, because of the lower temperatures employed in steps 1 and 2 of the preferred process there is no free molybdic or polymolybdic acid formed due to decomposition of ammonium molybdate, and the ammonium molybdate is completely solubilized in the subsequent step on addition of the silica sol. The stability of the slurry toward gellation at this point is from 3 to 10 times that of the material of identical composition when prepared by conventional procedures.

By utilizing the above procedure, a smooth slurry can be prepared with excellent reproducibility of homogeneity and viscosity. Furthermore, the slurry is characterized by being extremely stable, that is, it exhibits little change in physical appearance or in viscosity over an extended period of time. The two-stage addition of the silica sol provides the additional advantage of being able to utilize higher concentrations of silica and being able to spray dry slurries with a higher solids content. Solids content of the slurry may be further increased by evaporating or distilling some of the water from the slurry before spray drying. Spray drying of the slurry as obtained above, with high solids content, uniform physical properties, and excellent drying characteristics takes place at a high throughput in the spray dryer. Additionally there is little or no wall coating in the spray drier and the spray dried microspheres have a uniform high quality.

The exact quantities of the various ingredients to be employed in the preparation of the catalyst slurry may vary considerably and the actual amounts will depend upon the final composition desired.

It is important that the ingredients of the catalyst slurry be thoroughly mixed before spray drying and the mixing is conveniently accomplished by the use of conventional mixing equipment.

The spray drying step in the process of this invention is not critical and conventional spray drying equipment and techniques may be employed in the process of this invention. The principal advantage of spray drying is that it results in the production of a spherical particle which is usually not obtainable by other drying methods. The equipment usually consists essentially of a drying chamber, a source of hot gases, a means of atomizing the liquid feed and a method of separating the dry product from the exhaust gases. The equipment may be operated with countercurrent or cocurrent gas flow and may be heated by oil-, gas-, or coal-fired furnaces, indirect steam heaters, indirect coal-fired heaters, or by waste gases from plant boiler houses and the like. The inlet gas temperatures may vary over a wide range, but in general it is preferred that the temperature not exceed about 1000° F. Atomization may be accomplished by any one of several conventional atomizing devices; as for example, high-pressure nozzles, two-fluid nozzles and high-speed rotating discs.

The spray dried catalysts prepared according to the process of this invention are calcined at a temperature sufficiently high to remove volatile components and to adjust the activity and selectivity of the final catalyst. In order to obtain the optimum properties of the spray dried product it is necessary to subject the product to calcination at a temperature in the range of from about 700° to about 2000° F.

The preferred embodiments of the process of this invention and the advantages associated therewith are illustrated by the following examples. The stability of the catalyst slurry is indicated by the minimum variation in the viscosity of the slurry with the time elapsed before spray drying. In view of the broad teachings of the foregoing descriptions, certain modifications of the present invention as illustrated by the specific example will undoubtedly occur to those skilled in the art.

EXAMPLE 1

Method (A).—A catalyst having the composition 50 wt. percent-[Bi$_9$PMo$_{12}$O$_{52}$]-50 wt. percent SiO$_2$ was prepared according to the following conventional procedure:

81.6 grams of ammonium heptamolybdate were dissolved 81.6 grams of water at 150° F. The aqueous solution of ammonium heptamolybdate was added to a mixture containing 4.44 grams of 85 percent phosphoric acid and 375 grams of 40 weight percent colloidal silica sol, over a period of ten minutes. To this solution was added a mixture of 168 grams of bismuth nitrate $$(Bi(NO_3)_3 \cdot 5H_2O),$$

84.8 grams of water and 6.7 grams of 70 percent nitric acid at 160° F.

Method (B).—A catalyst having the same composition as the catalyst in part (A) was prepared according to the improved process as described in the instant invention according to the following procedure:

81.6 grams of ammonium heptamolybdate was added to 81.6 grams of water at 100° F. To this solution was added 375 grams of 40 weight percent colloidal silica sol over a 10 minute period. 4.44 grams of 85 percent phosphoric acid was then added to the solution, followed by the addition of a mixture containing 168 grams of bismuth nitrate (Bi(NO$_3$)$_3$·5H$_2$O), 84.8 grams of water and 6.7 grams of 70 percent nitric acid, at 100° F.

| Viscosities of catalyst slurries prepared by— | | | |
|---|---|---|---|
| Method (A) | | Method (B) | |
| Time, hours | Viscosity, centiposies | Time, hours | Viscosity, centipoises |
| ½ | 210 | ½ | 200 |
| 5 | 300 | 1 | 220 |
| 19 | 1,680 | 15 | 340 |
| 93 | 2,500 | 161 | 340 |
| 165 | 3,680 | | |

EXAMPLE 2

Method (A).—A catalyst having the composition: 50 wt. percent-[Fe$_{4.5}$Bi$_{4.5}$PMo$_{12}$O$_{52}$]-50 wt. percent SiO$_2$ was prepared in pilot plant quantities by conventional procedures according to the method of Example 1(A), except that ferric nitrate (Fe(NO$_3$)$_3$·9H$_2$O) was added to the catalyst solution along with the bismuth nitrate.

Method (B).—A catalyst having the same composition as the catalyst in part (A) was prepared in pilot plant quantities utilizing the same procedure as described in Example 1(B) except that ferric nitrate $$(Fe(NO_3)_3 \cdot 9H_2O)$$

was added to the catalyst solution with the bismuth nitrate.

A comparison of the preparational histories of catalysts prepared by methods (A) and (B) are shown below:

|  | Method (A) | Method (B) |
|---|---|---|
| Batch size | | 3 times the size of (A). |
| Number of batches discarded due to gellation. | 1 in 10 | None. |
| Slurry stability and reproducibility. | Viscosity increase from 50 to 3,000 cp. | Excellent. |
| Spray drying operation. | Variable feed properties; poor quality microspheres; 15–20% of product adhered to walls of spray drier. | Constant feed properties; no wall coating; excellent quality microspheres. |
| Production rate, lbs./day. | Up to 3,000 | 3 times the size of (A). |

Viscosities of catalyst slurries prepared by—

| Method (A) | | Method (B) | |
|---|---|---|---|
| Time, hours | Viscosity, centipoises | Time, hours | Viscosity, centipoises |
| 2[1] | 60 | 2[1] | 60 |
| 24 | 210 | 2 | 75 |
| 48 | 320 | 46 | 96 |
| 72 | 780 | 94 | 97 |
| 168 | 1,660 | 214 | 151 |

[1] Minutes.

EXAMPLE 3

Method (A).—A catalyst having the composition 50 wt. percent-[$K_{0.1}Fe_3Ni_{2.5}Co_{4.5}BiP_{0.15}Mo_{12}O_{50}$]-50 wt. percent $SiO_2$ was prepared by the conventional process described in Example 1(A) with the exception that the silica sol employed contained 50 wt. percent silica, and the nitrates of iron, cobalt and nickel were added to the catalyst solution along with the bismuth nitrate. This was followed by adding to the catalyst slurry the required amounts of potassium hydroxide (KOH) as a 45 percent aqueous solution.

Method (B).—A catalyst having the same composition as the catalyst in part (A) was prepared by the improved procedure described in Example 1(B) with the following exceptions:

(a) The ammonium heptamolybdate was added to an aqueous solution containing the required amount of potassium hydroxide (KOH).

(b) The silica sol containing 50 wt. percent colloidal silica was added in two stages, 60 percent of the required amount of silica being added to the solution containing the ammonium heptamoylbdate, as in Example 1(B), and 40 percent being added to the final catalyst slurry subsequent to the addition of the metal nitrates.

(c) The nitrates of iron, cobalt and nickel were added to the catalyst slurry along with the bismuth nitrate.

Viscosities of the catalyst slurries prepared by—

| Method (A) | | Method (B) | |
|---|---|---|---|
| Time, minutes | Viscosity, centipoises | Time, minutes | Viscosity, centipoises |
| 1 | 760 | 2 | 70 |
| 60 | 1,020 | 13 | 70 |
|  |  | 23 | 70 |
|  |  | 49 | 70 |
|  |  | 19[1] | 100 |

[1] Hours.

We claim:

1. A process for the manufacture of a catalyst suitable for use in a fluidized-bed catalytic reactor and comprising an oxide of molybdenum and a supporting member derived from a colloidal sol of an oxide selected from the group consisting of silica, alumina, titania, and zirconia, as essential ingredients and at least one of the oxides selected from the group consisting of phosphorus, arsenic, boron, bismuth, iron, cobalt, nickel, antimony, tin, magnesium, tellurium, manganese, calcium, zinc, cadmium, tantalum, niobium, the alkali metals and the rare earth metals, said process comprising the following steps in sequence:

(1) preparing a slurry of the catalyst components by adding to an aqueous suspension containing a molybdenum compound selected from the group consisting of a heptamolybdate and a dimolybdate at a temperature below about 150° F., the following ingredients in the following order; (a) the required amount of colloidal sol of the supporting member necessary for the catalyst formulation, in incremental proportions, (b) optionally one or more components selected from the group consisting of phosphorus, arsenic and boron, in the form of their corresponding acids, (c) the remaining metal components of the catalyst formulation as a solution of the combined metal salts selected from the group consisting of the nitrates, carbonates, oxalates, and acetates;

(2) subjecting the resulting catalyst slurry obtained from step (1) to a spray drying operation at a temperature below about 1000° F. to obtain spherical particles of uniform small size; and (3) collecting said particles from the spray drying operation and subjecting them to calcination at elevated temperatures.

2. A process for the manufacture of a catalyst suitable for use in a fluidized-bed catalytic reactor and comprising the oxides of molybdenum and silicon as essential ingredients and optionally one or more of the oxides selected from the group consisting of phosphorus, arsenic, boron, bismuth, iron, cobalt, nickel, antimony, tin, magnesium, tellurium, manganese, calcium, zinc, cadmium, tantalum, niobium, the alkali metals and the rare earth metals, said process comprising the following steps in sequence:

(1) preparing a slurry of the catalyst components by adding to an aqueous suspension containing a molybdenum compound selected from the group consisting of a heptamolybdate and a dimolybdate at a temperature below about 150° F., the following ingredients in the following order; (a) the required amount of colloidal silica sol necessary for the catalyst formulation, in incremental proportions, (b) optionally one or more components selected from the group consisting of phosphorus, arsenic and boron, in the form of their corresponding acids, (c) the remaining metal components of the catalyst formulation as a solution of the combined metal salts selected from the group consisting of the nitrates, carbonates, oxalates, and acetates;

(2) subjecting the resulting catalyst slurry obtained from step (1) to a spray drying operation at a temperature below about 1000° F. to obtain spherical particles of uniform small size; and (3) collecting said particles from the spray drying operation and subjecting them to calcination at elevated temperatures.

3. The process in claim 2 wherein a portion of the required amount of colloidal silica sol necessary for the catalyst formulation is added in step 1(a) and the remainder being added subsequent to step 1(c).

4. The process in claim 3 wherein the colloidal silica sol utilized contains from about 30 to 50 percent by weight of silica.

5. The process in claim 4 wherein the metal salts in step 1(c) are the nitrates.

6. The process in claim 2 wherein the acid component in step (b) is phosphorus and the metal component in step (c) is bismuth.

7. The process in claim 6 wherein the metal components in step (c) are iron and bismuth.

8. The process in claim 6 wherein the metal components in step (c) are potassium, iron, cobalt, nickel and bismuth.

9. A process for the manufacture of a catalyst suitable for use in a fluidized-bed catalytic reactor and comprising the oxides of molybdenum and silicon as essential ingredients and optionally one or more of the oxides selected from the group consisting of phosphorus, arsenic, boron, bismuth, iron, cobalt, nickel, antimony, tin, magnesium, tellurium, manganese, calcium, zinc, cadmium, tantalum, niobium, the alkali metals and the rare earth metals, said process comprising the following steps in sequence:

(1) to an aqueous solution of an alkali metal hydroxide at a temperature below about 150° F., are added the following ingredients in the following order, (a) a molybdenum compound selected from the group consisting of a heptamolybdate and a dimolybdate, (b) the required amount of colloidal silica sol necessary for the catalyst formulation in incremental proportions, (c) optionally one or more of the components selected from the group consisting of phosphorus, arsenic and boron, in the form of their corresponding acids, (d) the remaining metal components of the catalyst formulation as a solution of the combined metal salts selected from the group consisting of the nitrates, carbonates, oxalates and acetates;

(2) subjecting the resulting catalyst slurry obtained from step (1) to a spray drying operation at a temperature below about 1000° F. to obtain spherical particles of uniform small size; and (3) collecting said particles from the spray drying operation and subjecting them to calcination at elevated temperatures.

10. The process in claim 9 wherein a portion of the required amount of colloidal silica sol necessary for the catalyst formulation is added in step 1(b) and the remainder being added subsequent to step 1(d).

References Cited
UNITED STATES PATENTS

| | | | |
|---|---|---|---|
| 3,284,369 | 11/1966 | Bergna et al. | 252—458 X |
| 3,044,966 | 7/1962 | Callahan et al. | 252—437 |
| 3,380,931 | 4/1968 | Ryland | 252—432 |
| 3,497,461 | 2/1970 | McClellan et al. | 252—452 X |

PATRICK P. GARVIN, Primary Examiner

U.S. Cl. X.R.

252—432, 439, 448